Patented Sept. 9, 1941

2,255,044

UNITED STATES PATENT OFFICE 2,255,044

LOW-MELTING DECORATIVE GLAZE OF INCREASED RESISTANCE TO CHEMICAL AGENTS

Alden J. Deyrup, Elizabeth, N. J., assignor to E. I. du Pont de Nemours & Company, Wilmington, Del., a corporation of Delaware No Drawing. Application January 13, 1939, Serial No. 250,790

11 Claims. (Cl. 106—49)

This invention is concerned with the decoration of ceramic articles by the use of low-melting vitrifiable enamels. More particularly, it is concerned with the preparation of low-melting vitrifiable enamels or glazes, of the type used for decorating glassware and similar ceramic articles, which glazes may be pigmented or opacified. The glazes or low-melting enamels with which this invention is concerned are characterized by increased resistance to the action of chemical agents, without undue elevation in the maturing temperature of the glazes.

In my co-pending applications Ser. No. 131,528, filed March 17, 1937, now Patent No. 2,225,159, granted December 17, 1940; Ser. No. 132,660, filed March 23, 1937, now Patent No. 2,225,161, granted December 17, 1940; Ser. No. 192,965, filed February 28, 1938, now Patent No. 2,225,162, granted December 17, 1940; and Ser. No. 248,039, filed December 28, 1938, there have been described low-melting vitrifiable enamels of the type intended for application to glassware, which enamels are all characterized by improved resistance to chemical attack. The enamels or low-melting glazes described in said co-pending applications all contain as one ingredient in the flux composition titanium dioxide, said titanium dioxide being melted together with other ingredients thereof prior to fritting. The enamels described herein are, in part, an improvement on those described in my said co-pending patent applications, and the method of securing the increased resistance to chemical agents, characteristic of the new glaze compositions described herein, may be regarded as an extension of the discoveries disclosed in said co-pending patent applications, of which this is, in part, a continuation.

Vitrifiable low-melting enamels, fusible at temperatures low enough to permit their practical utilization in the decoration of glassware articles have, in the past, been characterized by very inferior resistance to the action of chemical agents. Generally their resistance to the attack of chemical agents has depended, in the past, primarily on the fusing temperature of the enamels. Those having fusing temperatures low enough to permit of their employment in the decoration of glassware have possessed chemical resistivity of such a low order as to render their utilization, especially in the decoration of articles intended to hold food products, decidedly hazardous. Many of these glaze compositions have been soluble to a substantial extent even in water.

As described in my co-pending patent applications previously referred to, the improvement of the resistivity of such glazes to the action of chemical agents has already been accomplished to a substantial degree, without any objectionable elevation in their fusing or maturing temperatures. The glazes described in my co-pending applications are of greatly improved stability toward attacks especially by acids, alkalies, cleaning agents, and sulfur-containing materials. However, these enamels would be substantially improved if their fusion temperatures could be lowered somewhat, while still maintaining a high degree of resistivity to the action of acids. The improvement of these glazes by lowering their maturing temperatures without substantial reduction in chemical resistance would be especially valuable in the case of certain low-melting enamels or glazes, such as those which are intended to be applied by the silk screen squeegee method or other method of application which does not result in a perfectly uniform application of the enamel composition to the ware before firing. When utilizing methods of application such as the silk screen squeegee method and other methods falling into this general category, it is necessary that the enamels become sufficiently fluid during firing, not only to mature to a high gloss, but also to flow to such an extent as to eliminate the irregularities resulting during application of the glaze to the glassware article. Such fluidity of the enamel during firing must, of course, occur at a temperature below the deformation range of the glass. Since ordinarily glassware articles will deform to an appreciable extent at temperatures in excess of about 1150° F., it is obvious that the decorative glazes must mature and flow to the extent necessary to eliminate irregularities in application at temperatures below that at which deformation of glassware may occur. All these low-melting glazes of the type used for decorating glassware melt well below 1200° F., and generally within the range 1000–1100° F., at which temperatures they are fired on the articles to be decorated.

It is generally known in the ceramic art that in the preparation of vitrifiable enamels the resistance of such an enamel to any form of chemical attack may be increased by altering the enamel composition so as to elevate its melting point. It is also generally known, conversely, that any alteration in the temperature which tends to lower the fusion temperature of the enamel will also tend to reduce its chemical resistance. The enamels described in my previously referred to co-pending patent applications, of which this application is, in part, a continuation, have been rendered superior in chemical resistance without any substantial elevation in their fusion temperature. I have now discovered that it is possible to increase still further the resistance of these enamels to the action of acids without undue elevation in fusion temperature and also that, if desired, it is possible even to lower the fusion temperature of these low-melting vitrifiable enamels without decreasing their resistance to the action of acids.

Accordingly, it is an object of my invention to prepare low-melting lead silicate and lead borosilicate vitrifiable enamels which are highly resistant to the action of acids. A further object of this invention involves the preparation of low-melting vitrifiable enamels of the lead silicate or lead borosilicate type which also contain a halide of the group of halides consisting of the chlorides, the bromides, and the iodides. These enamels will always contain silica and lead oxide, in addition the halide melted in as one constituent thereof, and may or may not contain other materials such as alkali metal oxides and/or boric acid. Other auxiliary components, added for special purposes but not materially affecting the chemical constitution of the glaze composition, may also be present. All these enamels mature to decorative coatings having surfaces with a high degree of gloss at practical glass decorating temperatures, and are of remarkably high resistance to the action of chemical agents such as acids.

It may therefore be stated that if a halide of the group consisting of the chlorides, the bromides and the iodides, is included as an ingredient in a low-melting silicate or lead borosilicate flux, the resulting low-melting enamels have substantially higher resistance to acids at equal fusion temperatures, and substantially equal resistance to acids at lower fusion temperatures, than is characteristic of the corresponding low-melting lead silicate or lead borosilicate enamel not containing any halide.

In carrying out my invention, it is essential that a compound or compounds of one or more of the halogens of the group comprising chlorine, bromine, and iodine be included as an ingredient in a low-melting lead silicate or lead borosilicate flux. It may often be desirable to include therein titanium dioxide, or the oxides of both titanium and lithium, in order that the resulting flux may be of maximum resistance to the action of acids. The preparation of glazes containing titanium dioxide melted in therewith as one constituent, or containing both titanium dioxide and lithium oxide, is described and claimed in certain of my previously referred to co-pending patent applications. In carrying out my invention, while the oxides of titanium or lithium or both may be present, there is no necessity that either oxide be present in order that the improved results attendant upon the presence of one or more of the halides specified may be secured.

It may be stated that the inclusion of the fluorides in many varied types of vitreous enamels is known to ceramists. Fluorides have, in particular, been included in glass, in metal enamels, and in certain vitrifiable enamel compositions of lower melting point. Among ceramists the inclusion of fluorides is, in general, commonly considered to exert a detrimental effect on the resistance of the resulting enamels to the action of acids. In the preparation of low-melting enamels containing fluorides, such as those of lead and sodium, I have found that their inclusion is detrimental to the ability of the vitrifiable enamels to resist the action of acids, as compared with enamels wherein the other constituents in the flux are adjusted to give a maturing temperature equal to that of the base composition to which the fluoride has been added. Surprisingly, the three other halides, the chlorides, bromides and iodides, have been found to have a contrary effect and to have a definitely beneficial effect on the resistivity of the glaze to the action of acids. This increased resistivity, attainable with chlorides, bromides and iodides, may be regarded as remarkable, as it was by no means evident that when present in a vitrifiable enamel composition these halides would remain therein to any extent during the operation of fusing the constituents.

Ceramists are already familiar with the fact that various halides, in addition to the fluorides, may be fused into batches of true glasses, such as those of the commercial borosilicate type, for the purpose of modifying the color of dissolved metallic coloring agents, such as cobalt oxide, or for producing white opacity. Such glasses have, however, been of the high melting type characterized generally by an absence of lead compounds, or by the presence of only very small amounts of lead oxide, an amount too small to render the product a low-melting vitrifiable enamel of the type utilized for glassware decoration.

When the great oxidizing power of lead oxide is considered in connection with the ease of oxidation of the chlorides, bromides and iodides, it is indeed remarkable that these halides will remain in any proportion, other than as mere traces, in the finished enamel. In addition to the relative ease with which the three halides specified are oxidized, it must be remembered that the chlorides, bromides and iodides of lead possess very low boiling points and ceramists, in general, would predict that substantially all the halide would depart from the glaze composition during the fusing operation. By analysis, however, I have determined that substantial quantities of these halides remain behind in the finished low-melting enamel. While in all cases the residual amount of these halides is less than that introduced into the glaze batch, the amount is in all instances substantial, and is an amount which may be readily reproduced by the control of smelting conditions.

It may also be mentioned that metallic halides, in particular the chlorides, have long been used for the salt glazing of brick and clay products. This procedure involves the use of high temperatures, temperatures sufficiently high to volatilize the salts employed, as the glazing agents are commonly used in the kiln but out of direct contact with the ware. There is no evidence that the halogens employed for glazing brick and clay products enter the resulting glazes as final constituents and, in any event, salt glazes of this type are not of any value for producing decorative coatings on glassware. They have been used solely for the glazing of clay base materials which can be safety heated to the very high temperature required.

In order that the composition of various batches which may be utilized for the preparation of my novel low-melting lead silicate and lead borosilicate fluxes or enamels of superior resistance to chemical agents and containing halides of the group comprising the chlorides, bromides and iodides may be fully apparent, the following typical batches may be given. In preparing the glaze compositions the entire batch, including the halide or halides present, is melted in the preparation of the flux.

TABLE 1

*Batches for the preparation of typical improved low-melting lead silicate glazes*

|  | Batch A | Batch B | Batch C | Batch D | Batch E | Batch F | Batch G |
|---|---|---|---|---|---|---|---|
| Litharge | 56.7 | 48.4 | 51.3 | 48.1 | 57.1 | 56.2 | 43.7 |
| Boric acid | 10.1 | 9.5 | 10.0 |  | 13.2 | 13.0 | 8.5 |
| Flint | 25.1 | 25.6 | 27.2 | 32.4 | 17.6 | 17.3 | 34.2 |
| Titanium dioxide |  | 5.2 | 5.5 | 3.3 | 4.4 | 4.3 | 3.4 |
| Sodium chloride |  |  | 3.0 | 1.8 |  | 2.2 |  |
| Potassium chloride |  |  |  |  |  |  | 3.0 |
| Lead chloride | 8.1 | 8.5 |  |  |  |  |  |
| Sodium bromide |  |  |  |  | 4.4 | 2.2 |  |
| Potassium iodide |  |  |  |  |  | 1.6 |  |
| Potassium carbonate (83% K₂CO₃) |  |  |  |  |  |  | 3.4 |
| Lithium carbonate |  | 2.8 | 3.0 | 6.9 |  |  | 3.8 |
| Cadmium oxide |  |  |  |  | 3.3 | 3.2 |  |
| Sodium silicate (23.5% Na₂O, 76.5% SiO₂) |  |  |  | 7.5 |  |  |  |

After melting, the fluxes resulting from the foregoing batch compositions will have the following calculated compositions:

TABLE 2

|  | Flux A | Flux B | Flux C | Flux D | Flux E | Flux F | Flux G |
|---|---|---|---|---|---|---|---|
| PbO | 59.1 | 51.4 | 48.6 | 46.7 | 55.4 | 51.7 | 42.3 |
| B₂O₃ | 6.2 | 5.8 | 6.3 |  | 8.1 | 8.1 | 5.4 |
| SiO₂ | 26.2 | 27.1 | 28.8 | 39.7 | 18.6 | 18.5 | 36.9 |
| TiO₂ |  | 5.5 | 5.8 | 3.4 | 4.7 | 4.6 | 3.7 |
| Na₂O |  |  | 1.7 | 2.8 | 1.4 | 1.3 |  |
| K₂O |  |  |  |  |  | 0.5 | 4.1 |
| Li₂O |  | 1.2 | 1.3 | 2.9 |  |  | 1.6 |
| CdO |  |  |  |  | 3.5 | 3.4 |  |
| PbCl₂ | 8.5 | 9.0 | 7.5 | 4.5 |  | 5.5 | 6.0 |
| PbBr₂ |  |  |  |  | 8.3 | 4.1 |  |
| PbI₂ |  |  |  |  |  | 2.3 |  |

In these tables all values are expressed in parts by weight. In each case where the final composition of the low-melting vitrifiable glaze has been calculated, no account has been taken of the loss in the halide or halides during the melting process. As a representative example, however, batch C and the resulting vitrifiable enamel or flux C may be taken as illustrative. The final flux was analyzed in this instance and found to contain 1.19% of chloride, expressed as Cl, as compared with the theoretical quantity in the batch of 1.93%. All of these fluxes were transparent, substantially colorless, vitrifiable products which remained clear after heating to the temperatures employed in their commercial utilization as vitrifiable enamels for the decoration of glassware.

It has been found that an amount of metallic halides equivalent to from 1 to 3% of halogen selected from the group consisting of chlorine, bromine and iodine, as Cl, Br, or I respectively, should preferably be present in the glaze batch and in the resulting enamel composition. However, I have found that a very substantial increase in acid resistance will occur when as little as 0.25% of chlorine, bromine, or iodine, or mixture thereof, is present. There is no particular advantage in increasing the amount of chlorine, bromine, or iodine, or mixture of these halogens, above 3% because of the difficulty of retaining the increased amounts of these halides during the process of melting. However, it appears that under favorable melting conditions amounts greater than 3% may sometimes be introduced with a consequent improvement in the resistant properties of the resulting enamel.

In the preparation of my improved glaze compositions, containing one or more of the halides specified, the usual processing methods may generally be employed, since the improved properties of my improved fluxes depend essentially upon the final chemical composition, rather than on the particular conditions under which the fluxes are manufactured. However, the conditions of preparation should be more carefully controlled and regulated than is necessary in the preparation of the ordinary commercial glass enamel fluxes.

The materials comprising the batch may be mixed together and melted by the application of heat in a refractory crucible. It is desirable to establish by empirical tests the exact conditions most suitable for the preparation of these fluxes. A temperature of 950 to 1150° C. (the temperature of the melt) will usually be found satisfactory. It may be mentioned that when alkali metal compounds yielding an alkali metal oxide are to be present in the finished flux, it is desirable to introduce the halides in the form of alkali metal halides, rather than as lead halides, in order to facilitate the smelting process in the manufacture of the vitrifiable composition.

The flux should be melted until frothing ceases and samples taken from the melt with an iron rod are clear and transparent. The flux may then be poured into water and thereby fritted. An analysis of a finely ground portion of the flux should then be made to indicate whether sufficient of the halide has been retained in the composition. If not, the conditions may be altered or a larger proportion of the halide or halides may be added to the batch. Once conditions and the composition of the batch are definitely established, reproducibility sufficient to permit commercial utilization and manufacture of the glazes is readily obtained.

The coarsely fritted flux resulting may be ground together with ceramic pigments in the usual manner to prepare pigmented vitrifiable enamels which are then ready for application to the articles, usually of glassware, which are to be decorated. In their mode of handling and method of application my new vitrifiable compositions are substantially similar to other known low-melting glassware enamels. The new products differ from these old compositions essentially in their superior resistance to attack by acids when compared with older compositions of equal maturing temperature, and in their superior gloss and the high degree of smoothness attainable on the decorated article, when compared with the compositions now known to the art which are of equal resistance to the action of acids.

In order that the superiority of my improved enamels to the action of chemical agents such as acids might be conclusively demonstrated, various articles were coated with the enamels prepared from the batch compositions previously specified. These vitrifiable enamels, after application and firing on the objects to be decorated, were subjected to tests to determine their resistance to the action of acids. Batches resulting in the glazes C and E previously described may be taken as illustrative and, for purposes of comparison, comparison glazes X and Y were prepared. These comparison glazes X and Y were prepared from certain batches X and Y, similar to C and E, except that the alkali halides were replaced by approximately equivalent weights of alkali carbonates and the amount of silica was increased until fusion temperatures identical respectively with those of vitrifiable enamels C and E were secured. The percentages of the constituents other than silica and halogen in fluxes X and C, and Y and E, are not quite identical respectively. In view of the empirical adjustments necessary to arrive at identical fusion temperatures it was impossible to have fluxes X and C and fluxes Y and E contain identical percentages of these other ingredients. Nevertheless the comparative fluxes contained, respectively, the same elements in similar proportions, with the exception of silica and halogens, and possessed identical maturing temperatures.

Batches X and Y, prepared without halides, but yielding vitrifiable glazes of substantially identical maturing temperatures as those resulting from batches C and E, had the following compositions:

TABLE 3

| | Batch X | Batch Y |
|---|---|---|
| Litharge | 50.7 | 57.8 |
| Boric acid | 10.0 | 13.4 |
| Flint | 27.8 | 17.8 |
| Titanium dioxide | 5.5 | 4.4 |
| Lithium carbonate | 3.0 | |
| Sodium carbonate | 3.0 | 3.3 |
| Cadmium oxide | | 3.3 |

After melting, the resulting fluxes were of the following calculated compositions:

TABLE 4

| | Flux X | Flux Y |
|---|---|---|
| PbO | 54.6 | 63.0 |
| $B_2O_3$ | 6.3 | 8.5 |
| $SiO_2$ | 30.0 | 19.5 |
| $TiO_2$ | 5.9 | 4.8 |
| $Li_2O$ | 1.3 | |
| $Na_2O$ | 1.9 | 2.1 |
| CdO | | 2.1 |

All numerical amounts are parts by weight.

The comparative tests are described in the following examples:

EXAMPLE I

A yellow enamel composition was prepared from batch C, as described in the foregoing tabular summary, by grinding therewith substantially 4% by weight of yellow lead antimonate ceramic pigment. This enamel was used to decorate glass cups, the inside surfaces of which were coated therewith.

The glaze was then tested for lead solubility by treatment for one half hour with boiled distilled white vinegar, in accordance with the test for lead glazes given in full in the July, 1938 Technical News Bulletin of the United States Bureau of Standards. The amount of lead dissolved, determined in accordance with the Bureau of Standards method, was less than two parts per million.

A similar cup was decorated with a yellow enamel prepared from previously referred to batch X, which enamel contained no halide but possessed a fusion temperature identical with that of enamel C. This glaze also contained 4% by weight of yellow lead antimonate ceramic pigment. When tested with boiled distilled white vinegar under identical conditions it was found that the lead solubility of this glaze, containing no chloride, bromide or iodide, was 18 parts per million. These values indicate the substantial improvement attainable by the use of the halides specified when present in a type of flux which is already highly resistant to the action of acids.

EXAMPLE II

A black enamel composition was prepared from the frit resulting from batch E, the proportions and ingredients of which are given in the foregoing tabular summary. This black enamel composition was prepared by grinding said vitrifiable flux with 10% by weight of black cobalt-chrome-iron ceramic pigment.

Glass tumblers were decorated with this vitrifiable glaze by the well-known squeegee process and then fired. For purposes of comparison, a similar black color was prepared from the previously referred to flux batch Y, which contained no halide but was otherwise similar to flux E in maturing temperature. This similar black vitrifiable glaze, containing no halides, was used to decorate another glass tumbler. Both tumblers and their decorative enamels were fired under identical conditions and were indistinguishable in appearance.

Both tumblers were then exposed for 16 hours to 5% acetic acid solution at room temperatures. The tumbler decorated with the enamel E containing substantial amounts of halides gave no evidence of attack by the acid. However, the tumbler decorated with the enamel Y containing no halides exhibited considerable fading and loss of gloss and was characterized by an objectionable iridescence.

A wide variety of sources may be used to secure the elements indicated in the calculated flux compositions set forth in all the foregoing tables. The necessary lead oxide may be secured from white lead, litharge, red lead, lead nitrate, or similar compounds, although I prefer to utilize white lead and litharge as these two oxides of lead do not contain extra oxygen which might lead to partial or variable oxidation of the halides to the gaseous halogens during the process of flux preparation. The silica may be secured from sand, flint, or other convenient source. Chlorides may be introduced as sodium chloride, lead chloride, zinc chloride, or other compound of chlorine. Iodides or bromides may be most conveniently introduced in the form of these halides of sodium or lead, or other sources of iodides and bromides may be utilized.

No definite conditions, times of melting, or temperatures necessary during melting can be specified or need be maintained in preparing my improved fluxes. Although it is generally preferable to maintain constant conditions of time and temperature, this constancy is not absolutely essential in practicing my invention. It is only necessary to bring the batch composition to its melting point and maintain it there for a period of time sufficient to insure thorough reaction of the components and the formation of a molten composition which is reasonably free of unreacted and undissolved materials. In the usual fritting operation the molten flux is ordinarily poured into water. However, it may also be poured out upon any convenient clean surface. After pouring, the flux may be crushed and ground, or otherwise comminuted as desired.

Any of the known ceramic pigments may be introduced into my improved fluxes by milling or grinding, or the ground flux may be used alone if desired in order to provide a transparent colorless coating. Among suitable pigments and opacifying agents may be mentioned lead antimonate, which yields a yellow, cobalt aluminate, which yields a blue, lead molybdate, which yields a white, zirconium oxide and other pigmentary agents or opacifiers. The exact proportions of pigment to be incorporated depend chiefly on the color desired and the nature of the pigment. Generally from 2 to 15% of pigment, based on the total weight of the flux, will be found satisfactory.

The improved low-melting glazes of the lead silicate or lead borosilicate type embodying my invention will, in all cases, have at least 25% by weight of lead oxide. Glazes containing lesser amounts of lead oxide are not of the low-melting type, suitable for application to glassware, and are not generally maturing at about 1100° F. or slightly higher, as are the enamels with which I am concerned. As a matter of fact, my preferred enamels will, in practically all cases, contain at least 40% by weight of lead oxide, and usually an amount of lead oxide falling within the range 45% to 60% by weight. These are the usual low-melting lead glazes known to the art which, without some adjustment to increase their resistance to the action of chemical agents, such as that giving the remarkable increased resistivity characteristic of this invention, would be so soluble in chemical agents as to render their use for the decoration of certain types of glassware (such as those utilized for the holding of food products) extremely hazardous or virtually impossible.

My preferred lead glazes of greatest increased resistance to the action of chemical agents will also contain titanium dioxide, present in amounts ranging from 1 to 8% by weight, and melted into the flux with the other ingredients thereof. Lithium oxide will also frequently be present, in amounts ranging from 1 to 4% by weight, the presence of this agent rendering the enamel exceedingly sulfide-resistant, as disclosed in one of said co-pending applications. Boric oxide or its equivalent such as boric acid may also be present in the batches used in the preparation of my improved glazes containing one or more of the halogens, chlorine, bromine, or iodine. Boric oxide, if present, usually does not exceed 10% by weight of the glaze.

In the appended claims the term "lead glaze" is intended to mean a lead silicate or lead borosilicate vitreous enamel composition, maturing below about 1200° F., and containing 25% or more by weight of lead oxide.

As changes in proportions, temperatures, times of melting and conditions of preparation, etc., could be made but would result in products still within the scope of the invention, it is intended that the foregoing description of preferred embodiments shall be regarded as illustrative and not restrictive. The scope of the invention is to be determined in accordance with the prior art and the appended claims.

I claim:

1. A low-melting lead glaze maturing below 1200° F. and containing at least 25% by weight of lead oxide, said glaze composition comprising from 0.25 to 3% by weight of a halogen selected from the group which consists of chlorine, bromine, and iodine.

2. A low-melting lead glaze maturing below 1200° F. containing at least 40% by weight of lead oxide and comprising, in addition to the usual lead oxide and silica ingredients, a halogen selected from the group which consists of chlorine, bromine, and iodine.

3. A low-melting lead glaze maturing below 1200° F. containing at least 40% by weight of lead oxide and comprising, in addition to the usual lead oxide and silica ingredients, a metallic halide selected from the group which consists of the metal chlorides, metal bromides, and metal iodides.

4. A low-melting lead glaze maturing below 1200° F. of superior resistance to the action of chemical agents, said lead glaze comprising from 45 to 60% by weight of lead oxide, silica, and a halogen selected from the group which consists of chlorine, bromine, and iodine.

5. A low-melting lead glaze maturing below 1200° F. of superior resistance to the action of chemical agents which comprises from 45 to 60% by weight of lead oxide, silica, and a metallic halide selected from the group which consists of the metal chlorides, metal bromides, and metal iodides.

6. A low-melting lead glaze maturing below 1200° F. comprising from 45 to 60% of lead oxide by weight, silica, and from 0.25 to 3% by weight of a halogen selected from the group which consists of chlorine, bromine, and iodine.

7. A low-melting lead glaze, of superior resistance to the action of chemical agents, which glaze comprises lead oxide, present in amounts constituting at least 25% by weight of said glaze composition, silica, titanium dioxide melted in with other constituents of said lead glaze in amounts ranging from 1 to 8% by weight, and a halogen selected from the group which consists of chlorine, bromine, and iodine, said lead glaze having a maturing temperature below 1200° F.

8. A low-melting lead glaze of superior resistance to the action of chemical agents, maturing below 1200° F., which lead glaze comprises at least 40% by weight of lead oxide, silica, titanium dioxide melted in with other constituents of said lead glaze in amounts ranging from 1 to 8% by weight, and a halogen selected from the group which consists of chlorine, bromine, and iodine in amounts up to 3% by weight.

9. A low-melting lead glaze maturing below 1200° F. of the type used for decorating glassware, which lead glaze comprises lead oxide in amounts ranging from 45 to 60%, silica in amounts up to 40%, titanium dioxide melted in with other constituents of said lead glaze in amounts ranging from 1 to 8%, and a metallic halide selected from the group which consists of the metal chlorides, metal bromides, and metal iodides, said amounts being by weight based on the total weight of the glaze.

10. A low-melting lead glaze of the type used for decorating glassware, which glaze comprises lead oxide, present in amounts constituting at least 25% by weight of said glaze composition, silica, titanium dioxide melted in with other constituents of said lead glaze in amounts ranging from 1 to 8% by weight, lithium oxide, and a halogen selected from the group which consists of chlorine, bromine, and iodine, said lead glaze maturing below 1200° F.

11. A low-melting lead glaze maturing below 1200° F. comprising lead oxide in the amount of at least 40%, silica, titanium dioxide melted in with other constituents of said lead glaze in amounts ranging from 1 to 8%, a halogen selected from the group which consists of chlorine, bromine, and iodine in amounts up to 3%, and lithium oxide in amounts ranging from 1 to 4%, all said percentages being by weight, based on the total weight of said glaze.

ALDEN J. DEYRUP.